US008199845B2

(12) United States Patent
Yu et al.

(10) Patent No.: US 8,199,845 B2
(45) Date of Patent: Jun. 12, 2012

(54) UP-LINK SDMA RECEIVER FOR WIMAX

(75) Inventors: Xiaoyong Yu, Grayslake, IL (US); Alan P. Rottinghaus, Barrington, IL (US); Timothy J. Wilson, Rolling Meadows, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 391 days.

(21) Appl. No.: 12/469,306

(22) Filed: May 20, 2009

(65) Prior Publication Data

US 2010/0296438 A1 Nov. 25, 2010

(51) Int. Cl.
| H04B 7/02 | (2006.01) |
| H04B 1/10 | (2006.01) |
| H04B 1/26 | (2006.01) |
| H04B 1/38 | (2006.01) |
| H04L 1/02 | (2006.01) |
| H04L 27/28 | (2006.01) |
| H04L 27/06 | (2006.01) |
| H04K 1/10 | (2006.01) |
| H04J 11/00 | (2006.01) |
| H04W 4/00 | (2009.01) |
| H04N 7/173 | (2011.01) |

(52) U.S. Cl. ........ 375/267; 375/260; 375/340; 375/350; 370/208; 370/328; 370/329; 455/302; 455/323; 455/561; 725/106; 725/118

(58) Field of Classification Search .......... 455/3.02, 455/57.1, 73, 132, 139, 143, 146, 276.1, 455/424, 450, 455, 456.5, 464, 526, 561; 370/203, 204, 206, 207, 208, 210, 252, 254, 370/307, 310, 315, 319, 329, 330, 334, 336, 370/338, 342–345, 350, 352, 386, 395.1, 370/401, 409, 461, 480, 507, 509, 328; 375/130, 375/132, 141, 143, 147, 220, 222, 259, 260, 375/267, 288, 299, 324, 330, 340, 341, 343, 375/346, 347, 371, 350; 725/105, 106, 111, 725/116, 118, 119, 126, 129, 131
See application file for complete search history.

(56) References Cited

U.S. PATENT DOCUMENTS 7,639,766 B2 * 12/2009 Wei .............................. 375/355
(Continued)

FOREIGN PATENT DOCUMENTS

WO 2008082243 A1 7/2008

OTHER PUBLICATIONS

Feng, Mei: "The International Search Report and the Written Opinion of the International Searching Authority", European Patent Office, Rijswijk, completed Jul. 8, 2010, mailed: Jul. 15, 2010, all pages.
Dai, X.: "Carrier frequency offset estimation for OFDM/SDMA systems using consecutive pilots", Communications, IEE Proceedings, vol. 152, Issue 5, Oct. 7, 2005, pp. 624-632.

(Continued)

Primary Examiner — Nay A Maung
Assistant Examiner — Paul P Tran

(57) ABSTRACT

A method, a system and a receiver device provide timing and frequency correction in a spatial division multiple access (SDMA) system. A timing and frequency correction (TFC) logic/utility obtains a timing error estimate by using pilot symbols on a slot of six tiles. The TFC logic estimates the timing error based on pilot phase differences between unique pairs of tiles when the frequency separation of the tiles is less than a threshold value. When none of the unique pairs of tiles satisfies the threshold value, the TFC logic estimates timing error based on an exhaustive search for each candidate phase error value. The TFC logic performs timing error correction via a timing error estimate based on pilots from the symbols received on each antenna. The TFC logic performs inexplicit frequency error correction according to phase differences based on relative symbol indices.

20 Claims, 4 Drawing Sheets

U.S. PATENT DOCUMENTS

| | | | | |
|---|---|---|---|---|
| 2001/0047424 A1* | 11/2001 | Alastalo et al. | | 709/236 |
| 2002/0018529 A1* | 2/2002 | Dabak et al. | | 375/267 |
| 2006/0159188 A1 | 7/2006 | Izumi | | |
| 2006/0205437 A1* | 9/2006 | Sung et al. | | 455/562.1 |
| 2007/0147533 A1* | 6/2007 | Thomas et al. | | 375/267 |
| 2008/0130813 A1 | 6/2008 | Hwang et al. | | |
| 2008/0268710 A1 | 10/2008 | Hashim et al. | | |
| 2008/0273510 A1 | 11/2008 | Mudulodu et al. | | |
| 2009/0258628 A1* | 10/2009 | Lindoff et al. | | 455/302 |
| 2009/0268841 A1* | 10/2009 | Kim et al. | | 375/267 |
| 2009/0323838 A1* | 12/2009 | Ho et al. | | 375/260 |
| 2010/0008331 A1* | 1/2010 | Li et al. | | 370/335 |

OTHER PUBLICATIONS

IEEE Standard 802.16—2007, "Air Interface for Broadband Wireless Access Systems", Aug. 2007, section 8.4.8.1.5.

WiMAX Forum, "Mobile Radio Conformance Tests Amendment: Wave 2 Tests", 2007, section 10.1.18, pp. 173-181.

* cited by examiner

UP-LINK SDMA RECEIVER FOR WIMAX

BACKGROUND

1. Technical Field

The present invention generally relates to wireless receiver systems and in particular to error compensation in wireless receiver systems.

2. Description of the Related Art

Uplink (UL) spatial division multiple access (SDMA) or collaborative multiple inputs multiple outputs (MIMO) system is an important feature in Worldwide Inter-operability for Microwave Access (WiMAX) which allows wireless communication devices of two mobile users to share the same radio resource at the same time. As a result, system capacity is theoretically doubled. In reality, channel information is unknown and timing errors and frequency errors are present in the received signal from each mobile user. A practical UL SDMA receiver must address the critical issues of channel estimation, timing error correction and frequency error correction.

A traditional minimum mean square error (MMSE) receiver/equalizer is the simplest receiver to implement and provides acceptable performance with perfect time/frequency synchronization. However, the MMSE receiver frequently experiences large performance loss. For example, performance of the MMSE receiver in the presence of 16-QAM (Quadrature Amplitude Modulation) degrades rapidly with modest timing or frequency offset. Conventional MMSE equalizers are unable to achieve the performance requirements in the presence of residual synchronization errors after ranging (i.e., estimating timing errors via training signals), especially for a WiMAX defined signal structure.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
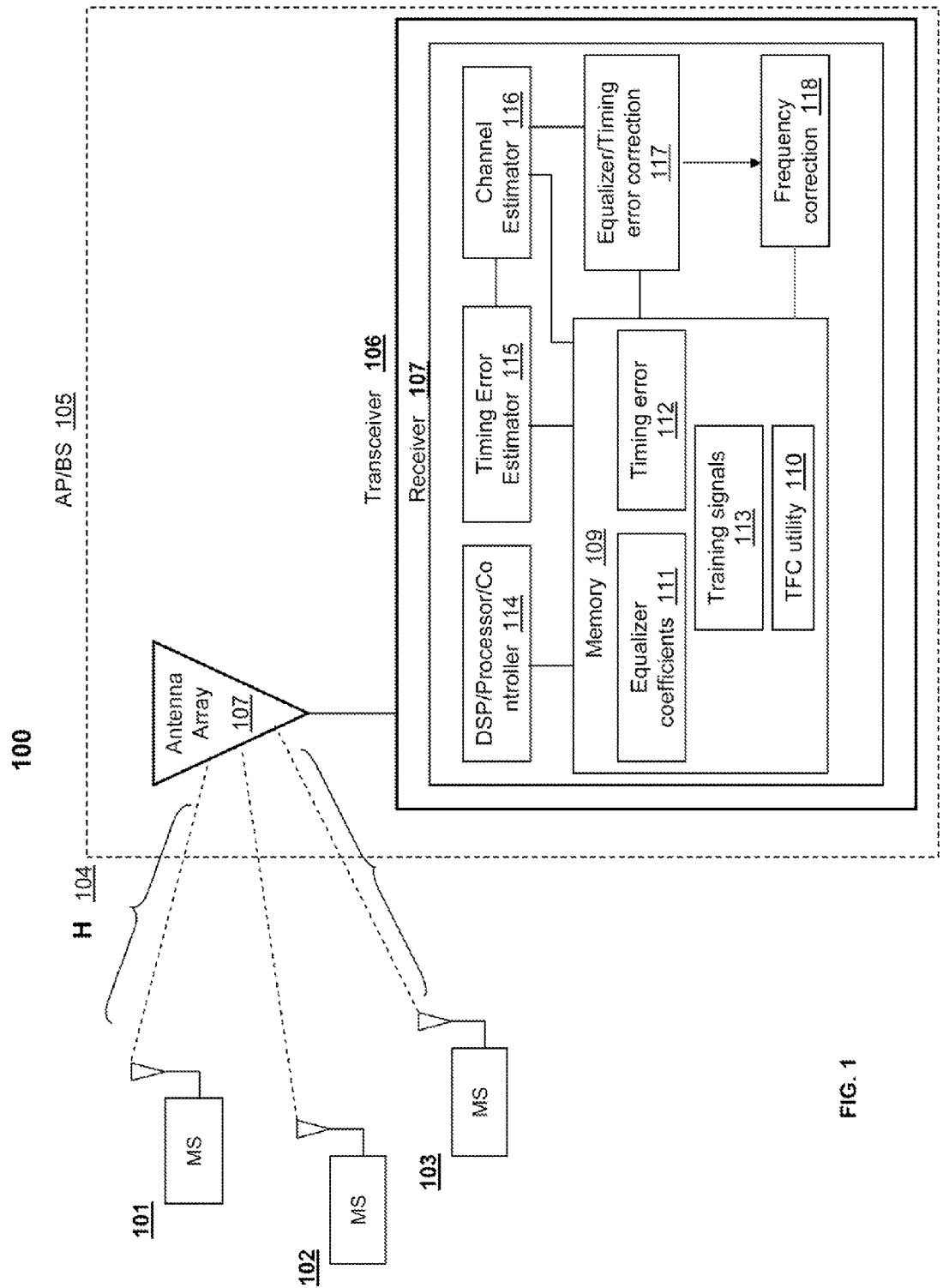
FIG. 1 provides a block diagram representation of an example wireless communication system within which the invention is practiced, according to one embodiment.

The illustrative embodiments provide a method, a system and a receiver device for providing timing and frequency correction in a spatial division multiple access (SDMA) system. A timing and frequency correction (TFC) logic/utility manages all timing and frequency synchronization. In actual implementation, the TFC logic/utility may include a timing error estimator, frequency error estimator and associated correction functions. The timing error estimator, which may be a sub-circuit of the TFC logic/utility, obtains a timing error estimate by using pilot symbols on a slot of six tiles. The timing error estimator estimates the timing error based on pilot phase differences between unique pairs of tiles when the frequency separation of the tiles is less than a threshold value. When none of the unique pairs of tiles satisfies the threshold value, the timing error estimator estimates timing error based on an exhaustive search for each candidate phase error value. The TFC logic performs timing error correction via a timing error estimate based on pilots received on each antenna. The TFC logic performs frequency error correction according to phase differences based on relative symbol indices.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example wireless communication system 100, as utilized within one embodiment. Wireless communication system 100 supports standards/networks based on OFDM technology and, particularly, for fourth generation (4G) networks including Worldwide Interoperability for Microwave Access (WiMAX). In particular, wireless system 100 support uplink (UL) spatial division multiple access (SDMA) communication. Wireless system 100 comprises a number ("L") of wireless communication devices, for example, mobile station (MS) 101, MS 102 and MS 103, which all connect to a base station 105 via an antenna array 107 of dimension "M". The number ("M") refers to the number of receiver antennas. One or more of the wireless communication devices may be associated with a mobile user/subscriber. Thus, in certain instances, these wireless communication devices are interchangeably referred to herein as user devices, mobile user devices, or users, as a general reference to the association of the device(s) to a device user. These references are however not intended to be limiting on the applicability of the invention to devices not directly associated with individual users. Base station 105 also may be referred to herein as an access point (AP). MS 101, MS 102 and MS 103 collectively transmit an independent information signal vector (e.g., "s") to base station 105 via a (complex) channel path H 104 that connects MS 101, MS 102 and MS 103 to base station 105 via antenna array 107.

BS 105 comprises antenna array 107 and transceiver 106. Illustrated within transceiver 106 is a radio frequency (RF) receiver device 107 (referred to herein as receiver 107). Receiver 107 comprises a memory 109 and a digital signal processor (DSP)/Processor/Controller 114. Also illustrated within receiver 107 is timing error estimator logic/circuitry 115 and channel estimator logic/circuitry 116. Equalizer/Timing Error Correction logic/circuitry 117 and Frequency correction logic/circuitry 118 are illustrated within receiver 107.

In addition to the above described hardware components of wireless system 100, various features of the invention are completed/supported via software (or firmware) code or logic stored within memory 109 or other storage and executed by DSP/Processor 114. Thus, for example, illustrated within memory 109 are a number of software/firmware/logic components, including equalizer coefficients 111, training signals 113, timing error estimate(s) 112 and timing and frequency correction (TFC) logic 110. In actual implementation, TFC logic 110 may be combined with (a) timing error estimator logic/circuitry 115, (b) channel estimator logic/circuitry 116, (c) Equalizer/Timing Error Correction logic/circuitry 117, and/or (d) Frequency correction logic/circuitry 118, to provide a single executable component, collectively providing the various functions of each individual component when the corresponding combined component is activated. For simplicity, TFC logic 110 is illustrated and described as a stand alone or separate logic/firmware component, which provides specific functions, as described below.

Certain functions supported and/or implemented by TFC utility/logic 110 utilize processing logic executed by DSP/processor 114 and/or device hardware to complete the implementation of that function. Among the software code/instructions/logic provided by TFC logic 110, and which are specific to the invention, are: (a) logic for estimating timing error based on pilot phase differences between unique pairs of tiles when an integer frequency separation of the tiles is less than a threshold value; (b) when none of the unique pairs of tiles satisfies the threshold value, logic for estimating timing error based on the level of phase correction provided by each candidate timing error value; and (c) logic for performing timing error correction based on a final timing error estimate; and (d) logic for performing frequency error correction according to phase differences based on relative symbol indices. According to the illustrative embodiment, when DSP/Processor 114 executes TFC logic 110, wireless system 100 initiates a series of functional processes that enable the above functional features as well as additional features/functionality. These features/functionalities are described in greater detail below within the description of FIGS. 2-4.

Those of ordinary skill in the art will appreciate that the hardware components and basic configuration depicted in FIG. 1 may vary. The illustrative components within wireless system 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

In wireless system 100, a time domain baseband signal, "$y_n^{(j)}$", is received on j-th antenna and can be expressed as $$y_n^{(j)} = \sum_{i=1}^{L} x_n^{(i)} \otimes h^{(i,j)} + z_n^{(j)}$$

where $x_n^{(i)}$ is the n-th sample of the transmitted signal of the i-th user device; $h^{(i,j)}$ represents the channel impulse response of the i-th user device to j-th receive antenna; "$\otimes$" denotes convolution and $z_n^{(j)}$ is additive white Gaussian noise (AWGN) associated with the j-th receive antenna. After performing a fast Fourier transform (FFT) of the received signal, the received frequency domain signal on k-th sub-carrier or tone is $$Y_k = H_k S_k + Z_k \quad \text{(Equation 1)}$$

where the small letters represent time domain signals, while capital letters denote frequency domain signals.

The frequency domain channel transfer function matrix "$H_k$" of dimension M×L is constituted by the set of channel vectors of the L user devices, each of which hosts the frequency domain channel transfer factors between the single transmitter antenna associated with a particular user device, such as MS 101, and the receiver via the antenna array. The frequency domain channel transfer function $H_k$ of the different user devices are different fading processes.

With minimum mean square error (MMSE) equalization, the equalized signal can be written as:

$$\tilde{S}_k = (H_k^H H_k + \sigma^2 \times I)^{-1} H_k^H Y_k = W_k^H Y_k$$

where $(\cdot)^H$ is the Hermitian transpose of the matrix, $\sigma^2$ is noise variance, and I is an L×L identity matrix. The signal after equalization is a M×1 vector, of which the i-th row item is applied in the detection of the transmit information for the i-th mobile user device on a sub-carrier basis. In the forthcoming description, the sub-carrier or tone index k has been omitted for notational convenience.

Figure 2:
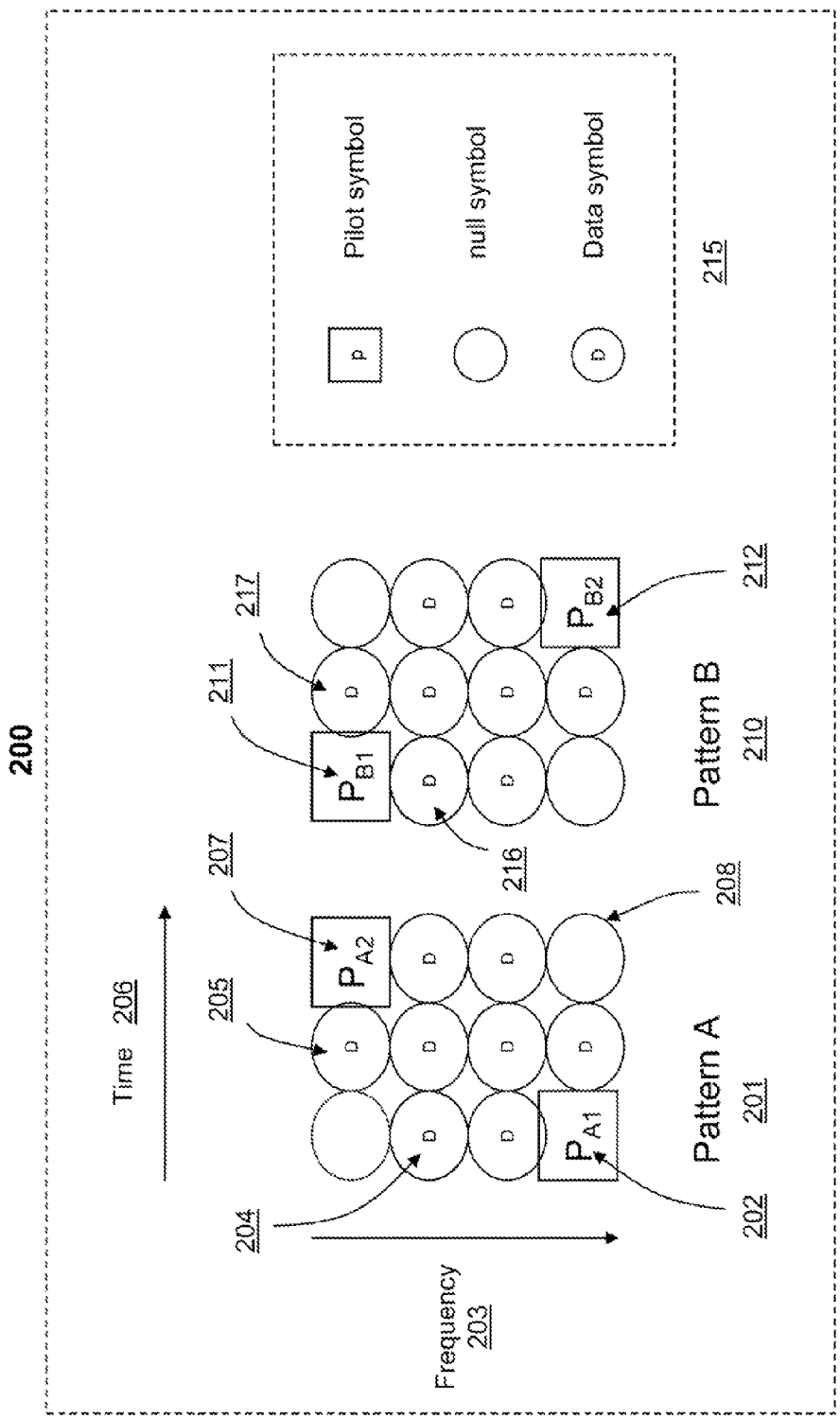
FIG. 2 illustrates a block diagram representation of the partial usage of sub-channels (PUSC) tile structure of uplink (UL) spatial division multiple access (SDMA) in Worldwide Inter-operability for Microwave Access (WiMAX) communications, according to one embodiment.
Figure 3:
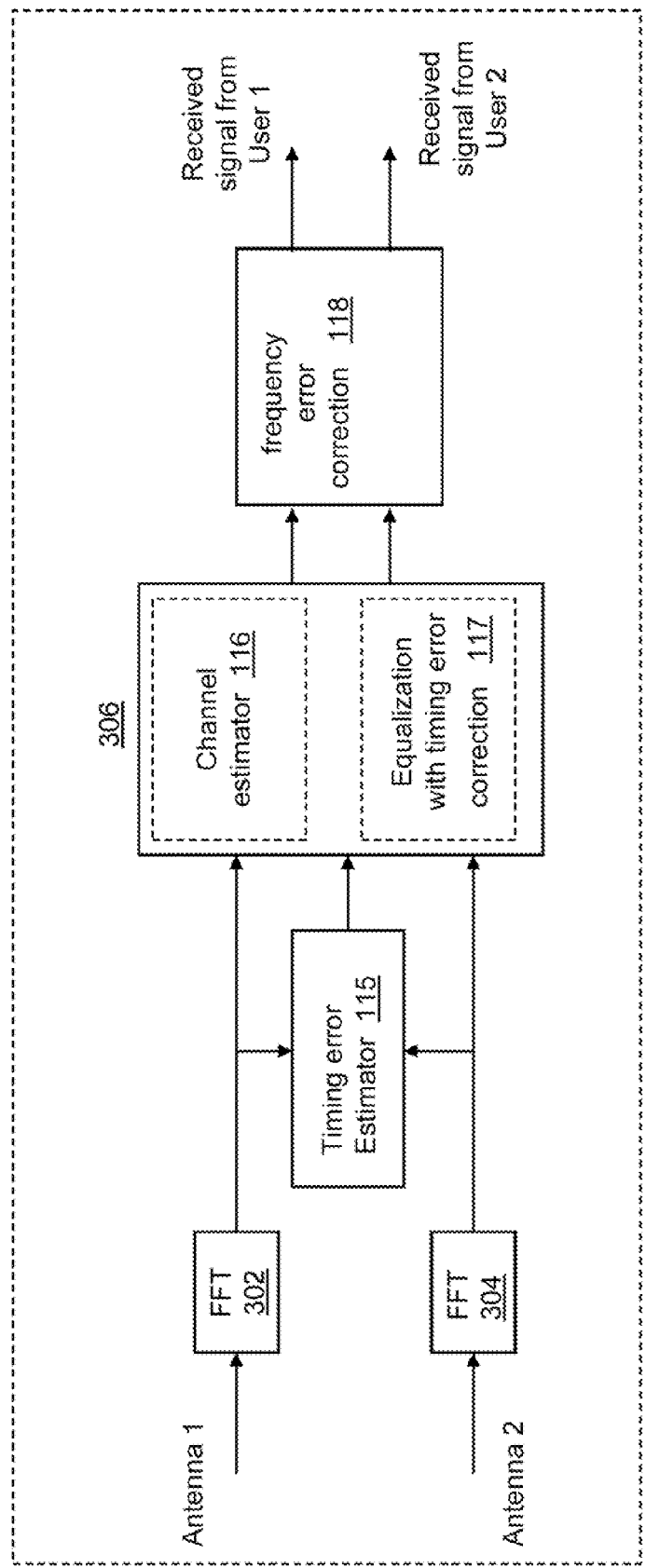
FIG. 3 illustrates a block diagram representation of a UL SDMA receiver, according to one embodiment.

Timing and frequency errors are present in the received signal for each mobile user device and TFC logic 110 provides the required timing and frequency correction (as described in FIG. 2 and FIG. 3). TFC logic 110 obtains a timing error estimate by calculating the phase ramp along the tone index within the same OFDM symbol. In addition, TFC logic 110 performs a frequency error estimation according to phase differences across multiple OFDM symbols along the same tone.

With reference now to FIG. 2, a block diagram representation of a structure of a partial usage of sub-channels (PUSC) tile 200 of UL SDMA in WiMAX, depicting the diagonal arrangement of pilot symbols for each wireless communication device in tile, is illustrated, according to one embodiment. PUSC UL SDMA tile 200 comprises pattern A 201 corresponding to a first mobile user device (e.g., MS 101) and pattern B 210 corresponding to a second mobile user device (e.g., MS 102). Also included in PUSC UL SDMA tile 200 is a tile legend 215. PUSC UL SDMA tile 200 also comprise frequency axis 203 and time/symbol interval axis 206. Illustrated within pattern A 201 are a pilot "$P_{A1}$" 202 and a pilot "$P_{A2}$" 207, each of which has a specific carrier tone and is located within a particular OFDM symbol. Pattern A 201 also comprises a first data symbol 204 located within the same OFDM symbol as $P_{A1}$ 202. In addition, Pattern A 201 comprises a second data symbol 205. Pattern B 210 comprises pilots "$P_{B1}$" 211 and "$P_{B2}$" 212. In addition, Pattern B 210 comprises a third data symbol 216 and a fourth data symbol 217.

In a WiMAX UL SDMA application, two (2) mobile users/wireless communication devices share a same OFDM radio resource. Each wireless communication device has one transmit antenna, so "L" is equal to 2 (i.e., two wireless communication devices, each with one transmit antenna). For simplicity, an example Diversity Access Point (DAP) system which uses a two element antenna array is described. Therefore, M=2 in the forthcoming description.

In PUSC UL SDMA tile 200, pattern A 201 and pattern B 210 respectively represent tile footprints of two mobile user devices. In reality, pattern A 201 and pattern B 210 are superimposed together to form the actual tile. However, for simplicity, pattern A 201 and pattern B 210 are illustrated as separate patterns of pilot/data symbols.

In PUSC UL SDMA tile 200, each mobile user device (e.g., MS 101) has two pilots (e.g., "$P_{A1}$" 202 and "$P_{A2}$" 207) diagonally in a tile (e.g., Pattern A 201). The power of each pilot is boosted 3 dB above data symbols. Given the sparse pilots within a tile, one channel estimate per tile per user is available. Removing the sub-carrier index k for simplicity, the channel estimate matrix is given by $$\hat{H} = \begin{bmatrix} \hat{H}_{1,1} & \hat{H}_{1,2} \\ \hat{H}_{2,1} & \hat{H}_{2,2} \end{bmatrix}$$

where each element in the matrix is given as $$\hat{H}_{1,1} = \frac{1}{2\sqrt{2}}(P_{A,1}(1) + P_{A,2}(1))$$

$$\hat{H}_{2,1} = \frac{1}{2\sqrt{2}}(P_{A,1}(2) + P_{A,2}(2))$$

$$\hat{H}_{1,2} = \frac{1}{2\sqrt{2}}(P_{B,1}(1) + P_{B,2}(1))$$

$$\hat{H}_{2,2} = \frac{1}{2\sqrt{2}}(P_{B,1}(2) + P_{B,2}(2))$$

where the number in parenthesis indicates antenna, for instance, $P_{A,1}(2)$ represents received first pilot of pattern A on antenna 2. Then the coefficient of the minimum mean square error (MMSE) equalizer is given as $$W = \hat{H}^H(\hat{H}^H\hat{H} + \sigma^2 I)^{-1}.$$

Timing and frequency errors are present in received signal for each wireless device. However, TFC utility 110 provides the required timing and frequency correction. A description of the impact of timing errors and frequency error in an OFDM system is provided below.

Given that $\tau_m$ represents the timing error of mobile device m, the nth baseband sample in an OFDM symbol is $$r_n = \sum_{m=1}^{L} x_{n+\tau_m}(m) e^{j\phi_m}$$

where $x_{n-\tau_m}(m)$ is time shifted base-band signal transmitted from the mobile device "m". The value $\phi_m$ is the related phase offset due to the timing error $\tau_m$. The data symbol on the k-th tone after an N-point FFT (and in what follows, N denotes FFT size) is given as $$\tilde{s}_k = \frac{1}{\sqrt{N}} \sum_{n=0}^{N-1} r_n e^{-j2\pi \frac{k}{N} n}$$

$$= \frac{1}{N} \sum_{n=0}^{N-1} \left[ \sum_{m=1}^{M} e^{j\phi_m} \sum_{i=0}^{N-1} U_i(m) s_i(m) e^{j2\pi \frac{n+\tau_m}{N} i} \right] e^{-j2\pi \frac{k}{N} n}$$

$$= e^{j\phi_m} s_k(m) e^{j2\pi \frac{\tau_m}{N} k}$$

where $s_k(m)$ is the transmitted data symbol of mobile/wireless device "m" on the kth tone; and $U_k(m)=1$ when the kth tone is assigned to wireless communication device "m", and $U_k(m)$ is equal to zero, otherwise.

Timing offset $\tau_m$ causes phase rotation in the received data symbols associated with mobile user/wireless communication device "m". For each individual tone, the phase error is a linear function of the tone index k.

To illustrate the impact of frequency errors, each mobile/wireless device is assumed to be associated with a frequency error $\Delta f_m$ in fraction of sampling frequency, (without loss of generality, the initial phase is expressed as zero for simplicity). Thus, the received signal samples may be expressed by:

$$r_n = \sum_{m=1}^{L} x_n(m) e^{j2\pi \Delta f_m n}$$

Based on linearity of the FFT, the FFT corresponding to each mobile device is examined separately. Then the final result is the summation of FFT outputs of all mobile devices. One OFDM symbol consists of (N+$N_{CP}$) samples, where $N_{CP}$ represents the number of samples in the cyclic prefix (CP), the kth tone of the pth OFDM symbol after N-point FFT for mobile device "m" is written as $$\tilde{s}_k(p) = \frac{1}{\sqrt{N}} \sum_{n=0}^{N-1} r_{n+(p-1)N+pN_{CP}} e^{-j2\pi \frac{k}{N} n}$$

$$= \frac{1}{N} \sum_{n=0}^{N-1} \left[ \sum_{i=0}^{N-1} s_i(p) e^{j2\pi \frac{n}{N} i} \right] e^{j2\pi \Delta f_m (n+(p-1)N+pN_{CP})} e^{-j2\pi \frac{k}{N} n}$$

$$\approx e^{j\Phi_m(p)} s_k(p) + e^{j\Phi_m(p)} \frac{1}{N} \sum_{i=0, i \neq k}^{N-1} s_i(p) \sum_{n=0}^{N-1} e^{j2\pi \frac{n}{N}(i-k)} e^{j2\pi \Delta f_m n}$$

In the previous equation, the indicator m is kept for $\Delta f_m$ only to distinguish each mobile device's frequency error, while m has been dropped from other variables for simplicity. In addition, $\Phi_m(p)=2\pi\Delta f_m((p-1)N+pN_{CP})$ is a phase due to the frequency error $\Delta f_m$ for OFDM symbol p associated with mobile user m. This phase is common to all tones of mobile user m within a particular OFDM symbol. The second term of the above equation represents inter-carrier interference (ICI) from other tones. The approximation is based on the fact that $$e^{j2\pi \Delta f_m k} \approx 1 \text{ for very small } \Delta f_m$$

Therefore the impact of frequency error is a common phase rotation for all tones in an OFDM symbol as well as inter-carrier interference (ICI) from other tones. For each OFDM symbol, the phase is a linear function of time or of the OFDM symbol index p.

The analysis above indicates/confirms that the ultimate impact of timing and frequency error is a received data constellation rotation. TFC utility 110 calculates the relative rotation of received pilots caused by timing and frequency errors. TFC utility 110 provides the following: (1) a timing error estimate by calculating the phase ramp along the tone index within a same OFDM symbol; and (2) a frequency error estimate by calculating the phase difference across multiple OFDM symbols along a same tone. Given the UL SDMA pilot structure, timing and frequency error estimates are calculated using multiple tiles, since there is only one pilot available in a tile for the estimate.

Due to sub-channel rotation or frequency hopping in WiMAX, there is no guarantee that any two tiles are contiguous in OFDM time-frequency grid. However, TFC utility 110 provides a timing error estimate for (a) a contiguous and short tile grid separation and (b) a long tile grid separation. Frequency correction (sub-circuit) 118 is able to provide an implicate/indirect frequency error estimate for data (represented by Pattern A 201, Pattern B 210) of two user devices (e.g., MS 101, MS 102) that are superposed in a tile, where each user device has separate timing and frequency errors.

Because UL SDMA resource granularity is one slot (one sub-channel within 3 OFDM symbol intervals, or equivalently 6 tiles), TFC utility 110 completes related estimate calculations within 6 tiles. In particular, TFC utility 110 explicitly estimates each user device's timing error within 3 OFDM symbols (one slot interval). Channel estimator 116 provides channel estimation based on the estimated timing error. Equalizer 117 uses the channel estimation in the MMSE equalizer to distinguish/separate the individual user signals then corrects each (separated) user device's timing error within a corresponding tile after equalization. Following signal equalization and timing error correction for each user device, frequency correction sub-circuit 118 inexplicitly corrects each user device's frequency error within a tile.

Referring now to FIG. 3, a block diagram is provided that illustrates uplink SDMA receiver 107 according to one embodiment. Receiver 107 comprises a first FFT block 302 which receives a signal that is detected via a first antenna, for example, an antenna 1, of antenna array 107 and a second FFT block 304 which receives a signal that is detected via a second antenna, for example, an antenna 2, of the antenna array. Also illustrated within receiver 107 is timing error estimator logic/circuitry 115, channel estimator logic/circuitry 116, Equalizer/Timing Error Correction logic/circuitry 117, and Frequency correction logic/circuitry 118. Channel estimator logic/circuitry 116 and Equalizer/Timing Error Correction logic/circuitry 117 are collectively illustrated by Estimator-Equalizer block 306.

At each FFT block 302, 304, received time domain signals are transformed into frequency domain signals. Thus, the frequency domain signals are a transformed representation of the time domain signal. In OFDM, a large number of closely-spaced orthogonal sub-carriers are used to carry data. The data is divided into several parallel data streams or channels, one for each sub-carrier. In OFDM, the frequency domain signals enable simpler/efficient analysis and processing of the data signals. The frequency domain signals may also be referred to herein as "symbols", "data symbols" or "OFDM symbols".

As described in FIG. 2, in order to calculate a timing error estimate and a frequency error estimate, a minimum of two pilots within the same OFDM symbol and two pilots using the same sub-carrier are required for respective estimates but only one pilot per tone and one pilot per symbol is available in the tile.

Due to sub-channel rotation or frequency hopping in WiMAX, there is no guarantee that any two tiles are contiguous with respect to the OFDM time-frequency grid. However, TFC utility 110 provides a timing error estimate for (a) a contiguous/short tile grid separation and (b) a non-contiguous/long tile grid separation.

TFC utility 110 is also able to provide timing and frequency error correction for all data symbols (e.g., first data symbol 204 and second data symbol 205 within pattern A 201, third data symbol 216 and fourth data symbol 217 within pattern B 210 of two users (e.g., MS 101, MS 102) that are superposed in a tile, where each user device has separate timing and frequency errors.

TFC utility 110 initiates a process to determine a timing error estimate by utilizing tiles within a slot interval (i.e., an interval of six (6) tiles). TFC utility 110 selects a group of tiles such that the distance of each pair of tiles is less than a specific number ("T") of tones. In particular, TFC utility 110 calculates a tone separation value between unique pairs of the selected tiles using respective pilot tone indices. TFC utility 110 compares the tone separation value to a pre-computed tone displacement threshold value. TFC utility 110 pre-computes the tone displacement threshold ("T") value such that $2\pi\tau_{max}T/N<\pi$. The parameter "N" represents a number of points in the FFT. The parameter "$\tau_{max}$" represents a maximum time delay or error. After the initial ranging process which involves the use of training sequences, the practical timing error magnitude is limited to within an interval of a half CP symbol interval, that is, the delay or error is limited to the following range:

$$-N_{CP}/2<\tau_{max}<N_{CP}/2.$$

The parameter "$N_{CP}$" represents a number of cyclic prefix samples in a OFDM symbol. In one embodiment, the practical timing error magnitude may be limited to within an interval of a fraction of the CP symbol interval.

When the tone separation corresponding to unique pairs of the selected tiles is less than the pre-computed tone separation threshold, TFC utility 110 obtains a pilot phase difference between the selected tiles via corresponding pilots, which corresponding pilots are located within the same OFDM symbol.

Given two receive antennas and two pilots per tile per user device, one phase difference value $\Phi_t$ is obtained by averaging of phase differences over four phase ramps, for example, in the case of the mobile user device (e.g., MS 101) of pattern A 201 and a pair of tiles, respectively indexed by "1" and "t", TFC utility 110 computes $$\Phi_t=\text{angle}(P_{1,A1}(1)P^*_{t+1,A1}(1)+P_{1,A2}(1)P^*_{t+1,A2}(1)+P_{1,A1}(2)P^*_{t+1,A1}(2)+P_{1,A2}(2)P^*_{t+1,A2}(2)).$$

$P_{1,A1}(1)$ 202 represents the received first pilot of pattern A 201 from tile 1 (e.g., PUSC tile 200) on antenna 1. $P^*_{t+1,A1}(1)$ represents the complex conjugate of $P_{t+1,A1}(1)$. TFC utility 110 obtains one estimate of timing error from $$\tau_t=\frac{N\times\Phi_t}{2\pi\times t},$$

where t is the number of tones between the pair of tiles that fulfill t<T.

TFC utility 110 tracks a quantity ("G") of unique pairs of inspected tiles for which the tone separation corresponding to unique pairs of the inspected tiles is less than the pre-computed tone separation threshold. TFC utility 110 generates a final timing error estimate from an average of all estimates, that is $$\tau = \frac{1}{G}\sum_{t=1}^{G}\tau_t,$$

where G is the selected number of pairs of tiles previously described. Once timing error is determined, TFC utility 110 modifies the channel estimate to enhance performance via elements of the UL SDMA practical channel estimate matrix as follows:

$$\hat{H}_{1,1} = \frac{1}{2\sqrt{2}}(P_{A,1}(1) \times e^{-j6\pi\tau_A/N} + P_{A,2}(1))$$

$$\hat{H}_{2,1} = \frac{1}{2\sqrt{2}}(P_{A,1}(2) \times e^{-j6\pi\tau_A/N} + P_{A,2}(2))$$

$$\hat{H}_{1,2} = \frac{1}{2\sqrt{2}}(P_{B,1}(1) + P_{B,2}(1) \times e^{-j6\pi\tau_B/N})$$

$$\hat{H}_{2,2} = \frac{1}{2\sqrt{2}}(P_{B,1}(2) + P_{B,2}(2) \times e^{-j6\pi\tau_B/N})$$

The parameters "$\tau_A$" and "$\tau_B$" represent the timing error of mobile with pattern A and B respectively. The equalizer coefficient ("W") is provided by the following equation:

$$W = \hat{H}^H(\hat{H}^H\hat{H} + \sigma^2 I)^{-1},$$

where the UL SDMA practical channel estimate matrix is provided as follows:

$$\hat{H} = \begin{bmatrix} \hat{H}_{1,1} & \hat{H}_{1,2} \\ \hat{H}_{2,1} & \hat{H}_{2,2} \end{bmatrix}.$$

UL SDMA equalizer output may be expressed as $$\tilde{S} = W^H Y$$

where W is the same for all 8 data symbols and 2 pilots in a tile for one user device. "Y" represents the received signals on all receive antennas, which are provided as inputs to the equalizer.

The timing error $\tau_m$ causes relative phase offset for the 8 data symbols and two pilots depending on a relative tone index in the tile. More specifically, for the first tone of the tile, there is no phase error due to timing error. For those data symbols on the second tone of the tile, there is a phase shift in amount of $e^{j2\pi\tau_m/N}$. Similarly, the phase offset is $e^{j4\pi\tau_m/N}$ and $e^{j6\pi\tau_m/N}$ for those data symbols on tone 3 and 4 respectively (one pilot on tone 4). Timing error correction is achieved by simple phase de-rotation provided by the equalizer. For all data symbols and pilot on tone 1 of a tile, no correction is needed. Data symbols on tone 2 of a tile are multiplied by $e^{-j2\pi\tau_m/N}$. Data symbols on tone 3 of a tile are multiplied by $e^{-j4\pi\tau_m/N}$. Data symbols and a pilot on tone 4 of a tile are multiplied by $e^{-j6\pi\tau_m/N}$.

Any residual constellation rotation after timing error correction is attributed to frequency error. Therefore the last stage is to perform phase rotation to achieve frequency error correction, without explicitly knowing the underlying frequency error. The amount of phase rotation depends on the relative OFDM symbol index in a tile. TFC utility 110 initiates a process to provide frequency error correction within a tile by calculating the phase difference between the two pilots of a user in the tile. For example, $\Omega_A = \text{angle}(P_{A,1} \times P^*_{A,2})$, where $P_{A,1}$ and $P_{A,2}$ are pilots of mobile with pattern A tile footprint in the tile. The character $\Omega_A$ represents the phase difference between the first and last OFDM symbol in the tile. For data in the first OFDM symbol, phase rotation is $e^{j0.5\Omega_A}$. For those data in the second OFDM symbol, no phase rotation is needed. Data in the last OFDM symbol is rotated by $e^{-j0.5\Omega_A}$. TFC utility 110 performs similar operations on the received signals of pattern B for another mobile user device.

While estimating the timing error by using groups of tiles, TFC utility 110 identifies a group of tiles from which none of the unique pairs of tiles meets the tone separation threshold requirement. The inability of any pair of tiles, within a particular slot interval, to meet the tone separation threshold may be the result of assigning the UL SDMA users to one subchannel in which the tiles (e.g., six tiles in PUSC for UL SDMA) are widely spread in the frequency dimension. In this case, the maximum timing error $\tau_{max}$ and smallest tile separation $T_{min}$ may satisfy the expression, $2\tau_{max}T_{min} > N$, which contradicts the requirement of $2\pi\tau_{max}T/N < \pi$. Consequently, the previously described approach to obtain a timing error estimate may yield inaccurate results due to phase ambiguity. Fortunately, the timing error is expected to assume a value within the CP interval during regular data transmission (after initial ranging), that is $\tau_m \in [-N_{CP}/2\ N_{CP}/2]$. TFC utility 110 may perform timing error estimate by a comprehensive search over a finite number of values. In particular, $\tau_m$ may be approximated by a value $t_u$, where $$t_u \in [-N_{CP}/2, -N_{CP}/2+1, \ldots, 1, 2, \ldots, N_{CP}/2-1, N_{CP}/2]$$

that is a set of ($N_{CP}+1$) integers.

When none of the group's unique pairs of tiles satisfies the threshold value (i.e., "G"=0), TFC utility 110 estimates timing error from an error correction convergence procedure. All pilots (i.e., a total of "K" pilots) within the same OFDM symbol "n" are multiplied by a complex conjugate value "$P^*_{(k(1),n)}$" which provides a resulting set ("$Q_{(k(i),n)}$") of "K" pilots. The value "$P^*_{(k(1),n)}$" is a complex conjugate value of a value "$P_{(k(1),n)}$", which value "$P_{(k(1),n)}$" represents a pilot of a first indexed sub-carrier tone (of the K pilots). All pilots are effectively rotated such that the first pilot $Q_{k(1),n}$ is a real number. The resulting set ("$Q_{(k(i),n)}$") of "K" pilots is obtained from the following equation:

$$Q_{(k(i),n)} = P_{(k(i),n)} P^*_{(k(1),n)}.$$

TFC utility 110 identifies candidate values of timing error estimates ("$t_u$") from a set comprising a total of "$N_{cp}+1$" consecutive integer values ranging from a first endpoint of $-N_{cp}/2$ to a second endpoint of $N_{cp}/2$. The parameter "$N_{cp}$" represents a number of cyclic prefix samples within the OFDM symbol. TFC utility 110 generates a set of "K" complex values "$W_i(t_u)$", which complex values "$W_i(t_u)$" represent candidate phase error correction (CPEC) fragments. The candidate phase error correction (CPEC) fragments ("$W_i(t_u)$") are obtained from the following CPEC fragments equation:

$$W_i(t_u) = Q_{k(i),n} - |Q_{k(i),n}| e^{j\frac{2\pi}{N}t_u(k(i)-k(1))},$$

where "i" is an index for the "K" pilots.

The variable "k(i)" indicates a corresponding frequency number/tone number of the "i-th" pilot, which is separated from any other pilot within the slot by more than "T" tones. For example, k(2) and k(3) may represent tone numbers "c" and "4c", respectively, where c+T<4c.

TFC utility 110 calculates $W_i(t_u)$ for a mobile user based on a number of pilots per tile and a number of receiver antennas. For example, in a wireless system which has 2 receiver antennas, 1 pilot in a first OFDM symbol per tile and a second pilot in a third OFDM symbol per same tile, the procedure provides 4 sets of $W_i(t_u)$. Each set provides K values corresponding to the K tiles and four sets provide 4K values. More generally, TFC utility 110 obtains a value "R" from a multiplicative product of (a) the number of receiver antennas and (b) the number of unique OFDM symbols per tile per mobile user device, within which OFDM symbols pilots are located. Then, TFC utility 110 uses the product of R and K to indicate the number of sets of $W_i(t_u)$ that is provided when TFC utility 110 completes the error correction convergence procedure.

Therefore, TFC utility 110 determines a detection metric ($M(t_u)$ for each value of $t_u$. The detection metric is given as $$M(t_u) = \sum_{i=1}^{4K} |W_i(t_u)|^2,$$

where u=1, 2, ..., $N_{CP}$, $N_{CP}$+1. TFC utility 110 obtains a minimum detection metric ("$M(t_o)$") from among the ($N_{CP}$+1) detection metrics. "$M(t_o)$" is provided by the following minimum detection metric equation:

$$M(t_o) = \min_u \{M(t_u)\},$$

where "$t_o$" is selected from the candidate values of timing error estimates as a final estimate of timing error "$\tau_m$" for mobile user "m" (e.g., MS 101).

Figure 4:
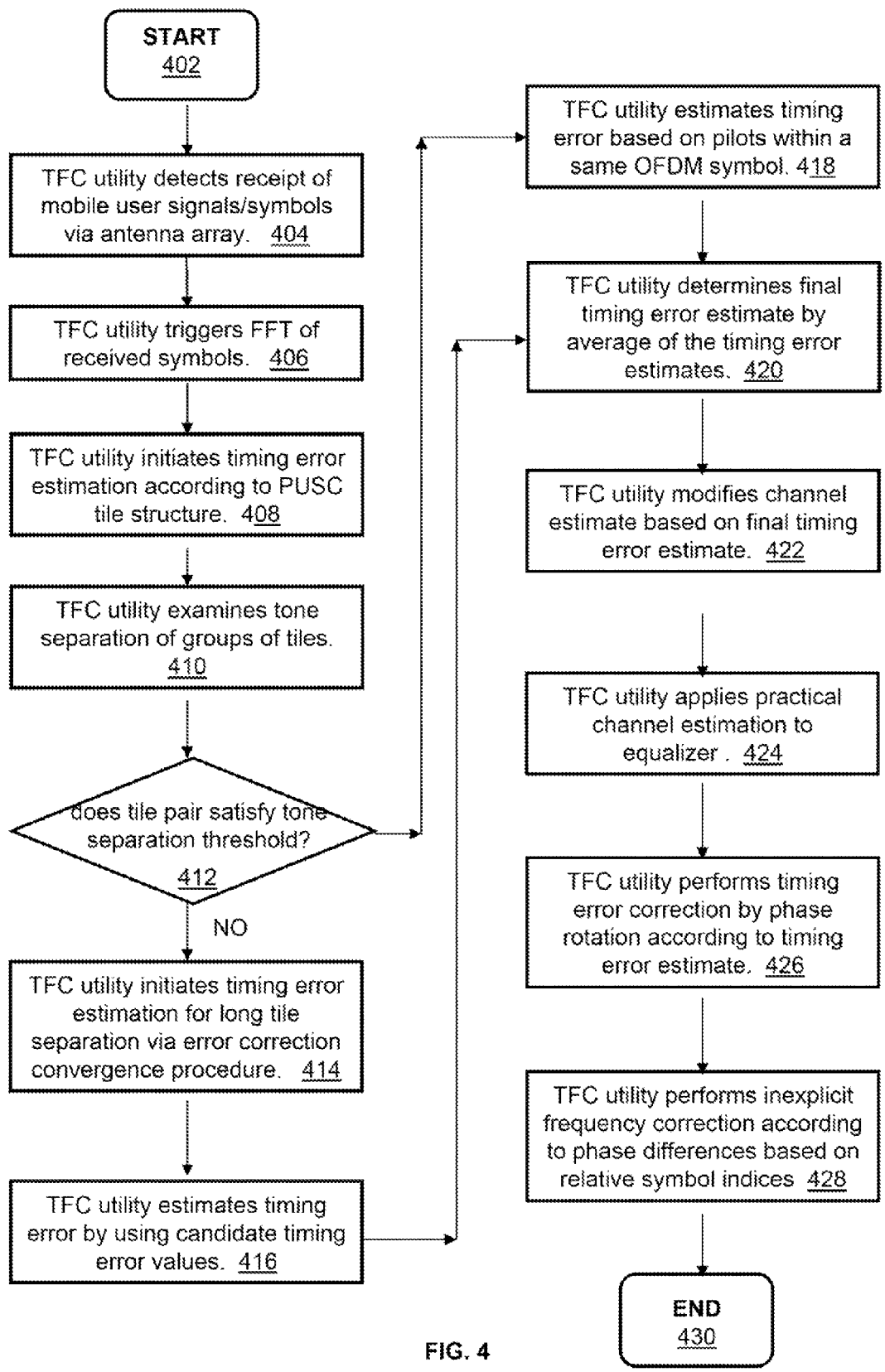
FIG. 4 is a flow chart illustrating the process of providing timing error correction and frequency error correction in a UL SDMA receiver, according to one embodiment.

FIG. 4 is a flow chart illustrating a method by which the above process of the illustrative embodiments is completed in accordance with an embodiment of the present invention. In particular, FIG. 4 illustrates the process of providing timing error correction and frequency error correction in a UL SDMA receiver. Although the method illustrated in FIG. 4 may be described with reference to components shown in FIGS. 1-3, it should be understood that this is merely for convenience and alternative components and/or configurations thereof can be employed when implementing the various methods. Key portions of the methods may be completed by TFC utility 110 executing on DSP/processor 114 within receiver 107 (FIG. 1) and controlling specific operations of/on receiver 107, and the methods are thus described from the perspective of either/both TFC utility 110 and receiver 107.

The process of FIG. 4 begins at initiator block 402 and proceeds to block 404, at which TFC utility 110 detects receipt of mobile user signals/symbols via antenna array 107. At block 406, TFC utility 110 triggers an FFT of the received symbols. At block 408, TFC utility 110 initiates a timing error estimation procedure, according to the partial usage of sub-channels (PUSC) tile structure for uplink (UL) SDMA. The PUSC tile structure for UL SDMA is defined by a frequency-time space/tile which has a three symbol interval and a frequency interval of four tones. Signals from multiple mobile users are generally superposed onto a same tile. TFC utility 110 examines tone separation values for pairs of tiles within corresponding groups of tiles, as shown at block 410. At decision block 412, TFC utility 110 determines whether any of the tile pairs in the group of tiles satisfies the tone separation threshold. If at block 412, TFC utility 110 determines that none of the tile pairs satisfies the tone separation threshold, TFC utility 110 initiates a timing error estimation method for long tile separation via an error correction convergence procedure, as shown at block 414, and proceeds to block 416. At block 416, TFC utility 110 uses all candidate timing error values to estimate timing error, and then proceeds to block 420. However, if at block 412, TFC utility 110 determines that at least one of the tile pairs satisfies the tone separation threshold, TFC utility 110 estimates the timing error based on pilots within a same symbol, as shown at block 418, and then proceeds to block 420.

At block 420, TFC utility 110 determines a final timing error estimate by an average of all timing error estimates. TFC utility 110 modifies the channel estimate for a channel based on the final timing error estimate, as shown at block 422. At block 424, TFC utility 110 applies the modified/practical channel estimation to the equalizer to generate an enhanced set of equalizer coefficients. TFC utility 110 performs timing error correction by phase rotation according to the final timing error estimate, as shown at block 426. At block 428, TFC utility 110 performs frequency correction according to phase differences based on relative OFDM symbol indices. The process illustrated by the flow chart of FIG. 4 ends at block 430.

The illustrated and described embodiments provide, in an uplink radio receiver, a mechanism and system that enables receiving a group of signals from one or more wireless communication device using uplink (UL) spatial division multiple access (SDMA) communications via an antenna array. TFC logic generates a group of symbols via fast fourier transform (FFT) operations on the received group of signals. The TFC logic arranges the group of symbols into tiles, according to a partial usage of sub-channels (PUSC) tile structure for UL SDMA.

The logic obtains a timing error estimate corresponding to the wireless communication device. In addition, the logic generates a practical channel estimate by using an average of timing error estimates to modify an estimate of a channel which substantially represents a perfectly synchronized channel. The TFC logic separates superposed symbols from multiple wireless communication devices into individual wireless communication device symbols via an equalizer enhanced with the practical channel estimate. The logic provides a timing error correction for the wireless communication device via the equalizer. Additionally, the logic enables inexplicit frequency error correction for individual wireless communication device symbols after the superposed symbols are separated and timing error is corrected.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module", "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional wireless communication system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless base-station having one or more radio frequency (RF) receivers, a method comprising:
   receiving a group of signals from one or more wireless communication devices using uplink (UL) spatial division multiple access (SDMA) communications via an antenna array;
   performing fast Fourier transform (FFT) operations on the received group of signals; and
   arranging a resultant group of transformed signals into tiles, according to a partial usage of sub-channels (PUSC) tile structure for UL SDMA;
   calculating a timing error estimate corresponding to the wireless communication device;
   generating a practical channel estimate by using an average of timing error estimates to modify an estimate of a channel that substantially represents a perfectly synchronized channel;
   separating, via an equalizer enhanced with the practical channel estimate, superposed symbols from multiple wireless communication devices into individual wireless communication device symbols;
   providing a timing error correction for the one or more wireless communication devices via the equalizer; and
   enabling an inexplicit frequency error correction for individual wireless communication device signals after the superposed symbols are separated and after the timing error correction.

2. The method of claim 1, wherein said calculating further comprises:
   calculating a tone separation value between unique pairs of tiles from a group of tiles, by using respective pilot tone indices, wherein said group of tiles are located within a PUSC slot interval;
   comparing the tone separation value to a pre-computed tone separation threshold value;
   wherein said pre-computed tone separation threshold is based upon a maximum time delay;
   wherein said maximum time delay is obtained from within a range of values having a first endpoint and a second endpoint, wherein said first and second endpoints are based on a fraction of the cyclic prefix (CP) symbol interval;
   when the tone separation value corresponding to said unique pairs of tiles is less than the pre-computed tone separation threshold, obtaining a pilot phase difference between the selected tiles via corresponding pilots, said corresponding pilots located within a same OFDM symbol, pilot phase difference is indexed by a tone separation value;
   tracking a quantity of unique pairs of tiles for which the tone separation value corresponding to unique pairs of the selected tiles is less than the pre-computed tone separation threshold value;
   calculating a timing error estimate by using one or more of: (a) an average of one or more pilot phrase differences corresponding to unique pairs of tiles; (b) a corresponding tone separation value; and (c) a number of FFT points for corresponding symbols;
   determining a final timing error estimate from an average of timing error estimates; and
   obtaining a channel estimate by using the final timing error estimate.

3. The method of claim 2, wherein said obtaining a pilot phase difference further comprises:
   calculating a number of pilot phase differences between pilots in a same OFDM symbol based on (a) a number of unique symbols per tile per wireless communication device, within which unique symbols, pilots are located and (b) a number of receiver antennas;

wherein two receiver antennas and two pilots located in separate symbols per tile per wireless communication device provide four pilot phase differences; and generating the average pilot phase difference from relevant pilot phase differences.

4. The method of claim 2, further comprising:

when the group of tiles does not provide a pair of unique tiles for which a tone separation value is less than the pre-computed tone separation threshold, estimating timing error from an error correction convergence procedure;

initiating said error correction convergence procedure with respective multiplicative operations between a complex conjugate value of a pilot of a first indexed sub-carrier tone and multiple pilots from the group of tiles within a same OFDM symbol, said pilot is located within a particular OFDM symbol, wherein said group of tiles comprises unique pairs of tiles, said unique pairs of tiles have a tone separation value that exceeds a threshold tone separation value;

said multiplicative operations provide a resulting set of phase rotated pilots;

wherein the resulting set of phase rotated pilots include a first pilot that is a real number;

identifying candidate values of timing error estimates from a set having multiple consecutive integer values ranging from the first endpoint to the second endpoint;

generating a set of candidate phase error correction fragments;

wherein said candidate phase error correction fragments are obtained from a candidate phase error correction (CPEC) fragments equation;

calculating said CPEC fragments for a receiving device based on (a) a number of unique symbols per tile per wireless communication device, within which unique symbols, pilots are located and (b) a number of receiver antennas; and determining a detection metric for each candidate value of timing error estimates via a detection metric equation which uses the CPEC fragments;

obtaining a minimum detection metric from among the detection metrics, wherein said minimum detection metric is provided by a minimum detection metric equation;

wherein said minimum detection metric is selected from the candidate values of timing error estimates as a final estimate of timing error for a wireless communication device.

5. The method of claim 1, wherein said generating a practical channel estimate further comprises:

when final timing error estimates for symbols from a pair of wireless communication devices are obtained, generating the practical channel estimate, according to the elements of the UL SDMA practical channel estimate matrix; and generating enhanced equalizer coefficients based upon the UL SDMA practical channel estimate matrix.

6. The method of claim 1, wherein said providing a timing error correction further comprises:

generating an UL SDMA equalizer output based upon the enhanced equalizer coefficients;

wherein said enhanced equalizer coefficients are the same values for data symbols and pilots in a same tile for a particular wireless communication device;

when data symbols and a pilot are located on a first tone of a tile, determining that no timing correction is required; and when data symbols and a pilot are not co-located on the first tone of a tile performing timing error correction by phase rotation of said data symbols based on one or more of: (a) the corresponding final timing error estimate; (b) a tone number of said data symbols; and (c) a tone number of one or more pilots on the tile.

7. The method of claim 1, wherein said enabling an inexplicit frequency error correction further comprises:

calculating a phase difference between the two pilots of a wireless communication device in the same tile;

wherein said phase difference between the two pilots of the wireless communication device in the same tile is a phase difference between a first and a last OFDM symbol in the tile, according to PUSC UL SDMA;

performing an amount of phase rotation based on one or more of: (a) a relative OFDM symbol index in a tile; and (b) the phase difference between pilots of a wireless communication device in the tile; and when data is located in a second OFDM symbol, determining that no phase rotation is needed, according to PUSC UL SDMA.

8. A radio frequency (RF) receiver device comprising:

a memory;

one or more processors;

wherein said one or more processors provides the functions of:

receiving a group of signals from one or more wireless communication devices using uplink (UL) spatial division multiple access (SDMA) communications via an antenna array;

performing fast Fourier transform (FFT) operations on the received group of signals; and arranging a resultant group of transformed signals into tiles, according to a partial usage of sub-channels (PUSC) tile structure for UL SDMA;

calculating a timing error estimate corresponding to the wireless communication device;

generating a practical channel estimate by using an average of timing error estimates to modify an estimate of a channel that substantially represents a perfectly synchronized channel;

separating, via an equalizer enhanced with the practical channel estimate, superposed symbols from multiple wireless communication devices into individual wireless communication device symbols;

providing a timing error correction for the one or more wireless communication devices via the equalizer; and enabling an inexplicit frequency error correction for individual wireless communication device signals after the superposed symbols are separated and after the timing error correction.

9. The radio frequency receiver device of claim 8, wherein said functions for calculating further comprises functions for:

calculating a tone separation value between unique pairs of tiles from a group of tiles, by using respective pilot tone indices, wherein said group of tiles are located within a PUSC slot interval;

comparing the tone separation value to a pre-computed tone separation threshold value;

wherein said pre-computed tone separation threshold is based upon a maximum time delay;

wherein said maximum time delay is obtained from within a range of values having a first endpoint and a second endpoint, wherein said first and second endpoints are based on a fraction of the cyclic prefix (CP) symbol interval;

when the tone separation value corresponding to said unique pairs of tiles is less than the pre-computed tone separation threshold, obtaining a pilot phase difference between the selected tiles via corresponding pilots, said corresponding pilots located within a same OFDM symbol, pilot phase difference is indexed by a tone separation value;

tracking a quantity of unique pairs of tiles for which the tone separation value corresponding to unique pairs of the selected tiles is less than the pre-computed tone separation threshold value;

calculating a timing error estimate by using one or more of: (a) an average of one or more pilot phrase differences corresponding to unique pairs of tiles; (b) a corresponding tone separation value; and (c) a number of FFT points for corresponding symbols;

determining a final timing error estimate from an average of timing error estimates; and obtaining a channel estimate by using the final timing error estimate.

10. The radio frequency receiver device of claim 9, wherein said functions for obtaining a pilot phase difference further comprises functions for:

calculating a number of pilot phase differences between pilots in a same OFDM symbol based on (a) a number of unique symbols per tile per wireless communication device, within which unique symbols, pilots are located and (b) a number of receiver antennas;

wherein two receiver antennas and two pilots located in separate symbols per tile per wireless communication device provide four pilot phase differences; and generating the average pilot phase difference from relevant pilot phase differences.

11. The radio frequency receiver device of claim 9, further comprising functions for:

when the group of tiles does not provide a pair of unique tiles for which a tone separation value is less than the pre-computed tone separation threshold, estimating timing error from an error correction convergence procedure;

initiating said error correction convergence procedure with respective multiplicative operations between a complex conjugate value of a pilot of a first indexed sub-carrier tone and multiple pilots from the group of tiles within a same OFDM symbol, said pilot is located within a particular OFDM symbol, wherein said group of tiles comprises unique pairs of tiles, said unique pairs of tiles have a tone separation value that exceeds a threshold tone separation value;

said multiplicative operations provide a resulting set of phase rotated pilots;

wherein the resulting set of phase rotated pilots include a first pilot that is a real number;

identifying candidate values of timing error estimates from a set having multiple consecutive integer values ranging from the first endpoint to the second endpoint;

generating a set of candidate phase error correction fragments;

wherein said candidate phase error correction fragments are obtained from a candidate phase error correction (CPEC) fragments equation;

calculating said CPEC fragments for a receiving device based on (a) a number of unique symbols per tile per wireless communication device, within which unique symbols, pilots are located and (b) a number of receiver antennas; and determining a detection metric for each candidate value of timing error estimates via a detection metric equation which uses the CPEC fragments;

obtaining a minimum detection metric from among the detection metrics, wherein said minimum detection metric is provided by a minimum detection metric equation;

wherein said minimum detection metric is selected from the candidate values of timing error estimates as a final estimate of timing error for a wireless communication device.

12. The radio frequency receiver device of claim 8, wherein said functions for generating a practical channel estimate further comprises functions for:

when final timing error estimates for symbols from a pair of wireless communication devices are obtained, generating the practical channel estimate, according to the elements of the UL SDMA practical channel estimate matrix; and generating enhanced equalizer coefficients based upon the UL SDMA practical channel estimate matrix.

13. The radio frequency receiver device of claim 8, wherein said functions for providing a timing error correction further comprises functions for:

generating an UL SDMA equalizer output based upon the enhanced equalizer coefficients;

wherein said enhanced equalizer coefficients are the same values for data symbols and pilots in a same tile for a particular wireless communication device;

when data symbols and a pilot are located on a first tone of a tile, determining that no timing correction is required; and when data symbols and a pilot are not co-located on the first tone of a tile performing timing error correction by phase rotation of said data symbols based on one or more of: (a) the corresponding final timing error estimate; (b) a tone number of said data symbols; and (c) a tone number of one or more pilots on the tile.

14. The radio frequency receiver device of claim 8, wherein said functions for enabling an inexplicit frequency error correction further comprises functions for:

calculating a phase difference between the two pilots of a wireless communication device in the same tile;

wherein said phase difference between the two pilots of the wireless communication device in the same tile is a phase difference between a first and a last OFDM symbol in the tile, according to PUSC UL SDMA;

performing an amount of phase rotation based on one or more of: (a) a relative OFDM symbol index in a tile; and (b) the phase difference between pilots of a wireless communication device in the tile; and when data is located in a second OFDM symbol, determining that no phase rotation is needed, according to PUSC UL SDMA.

15. A wireless base-station comprising:

an antenna array; and a radio frequency (RF) receiver;

wherein said RF receiver comprises processing logic that is configured to:

receive a group of signals from one or more wireless communication devices using uplink (UL) spatial division multiple access (SDMA) communications via an antenna array;

perform fast Fourier transform (FFT) operations on the received group of signals; and arrange a resultant group of transformed signals into tiles, according to a partial usage of sub-channels (PUSC) tile structure for UL SDMA;

calculate a timing error estimate corresponding to the wireless communication device;

generate a practical channel estimate by using an average of timing error estimates to modify an estimate of a channel that substantially represents a perfectly synchronized channel;

separate, via an equalizer enhanced with the practical channel estimate, superposed symbols from multiple wireless communication devices into individual wireless communication device symbols;

provide a timing error correction for the one or more wireless communication devices via the equalizer; and enable an inexplicit frequency error correction for individual wireless communication device signals after the superposed symbols are separated and after the timing error correction.

16. The base-station of claim 15, wherein the processing logic is configured to calculate a timing error estimate by:

calculating a tone separation value between unique pairs of tiles from a group of tiles, by using respective pilot tone indices, wherein said group of tiles are located within a PUSC slot interval;

comparing the tone separation value to a pre-computed tone separation threshold value;

wherein said pre-computed tone separation threshold is based upon a maximum time delay;

wherein said maximum time delay is obtained from within a range of values having a first endpoint and a second endpoint, wherein said first and second endpoints are based on a fraction of the cyclic prefix (CP) symbol interval;

when the tone separation value corresponding to said unique pairs of tiles is less than the pre-computed tone separation threshold, obtaining a pilot phase difference between the selected tiles via corresponding pilots, said corresponding pilots located within a same OFDM symbol, pilot phase difference is indexed by a tone separation value;

tracking a quantity of unique pairs of tiles for which the tone separation value corresponding to unique pairs of the selected tiles is less than the pre-computed tone separation threshold value;

calculating a timing error estimate by using one or more of: (a) an average of one or more pilot phase differences corresponding to unique pairs of tiles; (b) a corresponding tone separation value; and (c) a number of FFT points for corresponding symbols;

determining a final timing error estimate from an average of timing error estimates; and wherein said processing logic is configured to obtain a channel estimate based on the final timing error estimate.

17. The base-station of claim 16, wherein the processing logic is configured to obtain a pilot phase difference by:

calculating a number of pilot phase differences between pilots in a same OFDM symbol based on (a) a number of unique symbols per tile per wireless communication device, within which unique symbols, pilots are located and (b) a number of receiver antennas;

wherein two receiver antennas and two pilots located in separate symbols per tile per wireless communication device provide four pilot phase differences; and generating the average pilot phase difference from relevant pilot phase differences.

18. The base-station of claim 16, the processing logic further is configured to:

when the group of tiles does not provide a pair of unique tiles for which a tone separation value is less than the pre-computed tone separation threshold, estimate timing error from an error correction convergence procedure;

initiate said error correction convergence procedure with respective multiplicative operations between a complex conjugate value of a pilot of a first indexed sub-carrier tone and multiple pilots from the group of tiles within a same OFDM symbol, said pilot is located within a particular OFDM symbol, wherein said group of tiles comprises unique pairs of tiles, said unique pairs of tiles have a tone separation value that exceeds a threshold tone separation value;

said multiplicative operations provide a resulting set of phase rotated pilots;

wherein the resulting set of phase rotated pilots include a first pilot that is a real number;

identify candidate values of timing error estimates from a set having multiple consecutive integer values ranging from the first endpoint to the second endpoint;

generate a set of candidate phase error correction fragments;

wherein said candidate phase error correction fragments are obtained from a candidate phase error correction (CPEC) fragments equation;

calculate said CPEC fragments for a receiving device based on (a) a number of unique symbols per tile per wireless communication device, within which unique symbols, pilots are located and (b) a number of receiver antennas; and determine a detection metric for each candidate value of timing error estimates via a detection metric equation which uses the CPEC fragments;

obtain a minimum detection metric from among the detection metrics, wherein said minimum detection metric is provided by a minimum detection metric equation;

wherein said minimum detection metric is selected from the candidate values of timing error estimates as a final estimate of timing error for a wireless communication device.

19. The base-station of claim 15, wherein the processing logic is configured to generate a practical channel estimate by:

when final timing error estimates for symbols from a pair of wireless communication devices are obtained, generating the practical channel estimate, according to the elements of the UL SDMA practical channel estimate matrix; and generating enhanced equalizer coefficients based upon the UL SDMA practical channel estimate matrix.

20. The base-station of claim 15, the processing logic further is configured to:

generate an UL SDMA equalizer output based upon the enhanced equalizer coefficients;

wherein said enhanced equalizer coefficients are the same values for data symbols and pilots in a same tile for a particular wireless communication device;

when data symbols and a pilot are located on a first tone of a tile, determine that no timing correction is required;

when data symbols and a pilot are not co-located on the first tone of a tile perform timing error correction by phase rotation of said data symbols based on one or more of: (a) the corresponding final timing error estimate; (b) a tone number of said data symbols; and (c) a tone number of one or more pilots on the tile;

calculate a phase difference between the two pilots of a wireless communication device in the same tile;

wherein said phase difference between the two pilots of the wireless communication device in the same tile is a phase difference between a first and a last OFDM symbol in the tile, according to PUSC UL SDMA;

perform an amount of phase rotation based on one or more of: (a) a relative OFDM symbol index in a tile; and (b) the phase difference between pilots of a wireless communication device in the tile; and when data is located in a second OFDM symbol, determine that no phase rotation is needed, according to PUSC UL SDMA.

* * * * *